United States Patent
Tian et al.

(10) Patent No.: US 12,162,188 B2
(45) Date of Patent: Dec. 10, 2024

(54) ANTI-ABLATIVE COATING MATERIAL FOR RESIN-BASED COMPOSITE MATERIAL AND PREPARATION METHOD THEREFOR

(71) Applicant: AECC BEIJING INSTITUTE OF AERONAUTICAL MATERIALS, Beijing (CN)

(72) Inventors: Haoliang Tian, Beijing (CN); Jie Pang, Beijing (CN); Changliang Wang, Beijing (CN); Mengqiu Guo, Beijing (CN); Huanhuan Zhang, Beijing (CN); Junguo Gao, Beijing (CN); Yang Yu, Beijing (CN); Zhihui Tang, Beijing (CN); Yongjing Cui, Beijing (CN)

(73) Assignee: AECC BEIJING INSTITUTE OF AERONAUTICAL MATERIALS, Beijing (CN)

( * ) Notice: Subject to any disclaimer, the term of this patent is extended or adjusted under 35 U.S.C. 154(b) by 712 days.

(21) Appl. No.: 17/420,561

(22) PCT Filed: Jun. 17, 2020

(86) PCT No.: PCT/CN2020/000141
§ 371 (c)(1),
(2) Date: Jul. 2, 2021

(87) PCT Pub. No.: WO2021/012628
PCT Pub. Date: Jan. 28, 2021

(65) Prior Publication Data
US 2022/0118654 A1    Apr. 21, 2022

(30) Foreign Application Priority Data
Jul. 22, 2019    (CN) .......................... 201910660793.2

(51) Int. Cl.
*B29B 9/08*    (2006.01)
*B29B 9/12*    (2006.01)
(Continued)

(52) U.S. Cl.
CPC .................. *B29B 9/08* (2013.01); *B29B 9/12* (2013.01); *C08K 7/18* (2013.01); *C08L 29/04* (2013.01);
(Continued)

(58) Field of Classification Search
CPC ...... C08K 2003/085; C08K 2003/2244; C08K 3/36; C08K 3/22; C08K 2003/2248; B29B 9/00
See application file for complete search history.

(56) References Cited

U.S. PATENT DOCUMENTS

2005/0118331 A1    6/2005    Ruud et al.
2005/0123785 A1    6/2005    Sahoo et al.
(Continued)

FOREIGN PATENT DOCUMENTS

CN    1884405 A    12/2006
CN    101518968 A    9/2009
(Continued)

OTHER PUBLICATIONS

CN 105347831 and translation (Year: 2016).*
(Continued)

*Primary Examiner* — Farah Taufiq
*Assistant Examiner* — John W Hatch
(74) *Attorney, Agent, or Firm* — Osha Bergman Watanabe & Burton LLP

(57) ABSTRACT

A resin matrix composite used as anti-ablation coating material and its preparation method is provided. The resin matrix composite is a mixture of yttria-stabilized zirconia (YSZ), a resin, Cu, and $SiO_2$. The mixture is uniform and include spherical particles or spherical aggregates. A method for preparing a resin matrix composite for anti-ablation coating includes mixing YSZ, a resin, Cu, and $SiO_2$ to obtain a mixed powder and performing spray granulation of the mixed powder to obtain a resin matrix composite including spherical particles or spherical agglomerates.

7 Claims, 1 Drawing Sheet

(51) Int. Cl.
*C08K 7/18* (2006.01)
*C08L 29/04* (2006.01)
*C08L 83/04* (2006.01)
*B29K 29/00* (2006.01)
*B29K 105/00* (2006.01)
*B29K 283/00* (2006.01)
*C08K 3/22* (2006.01)
*C08K 3/36* (2006.01)

(52) U.S. Cl.
CPC .......... *C08L 83/04* (2013.01); *B29K 2029/04* (2013.01); *B29K 2105/251* (2013.01); *B29K 2283/00* (2013.01); *C08K 2003/2244* (2013.01); *C08K 2003/2248* (2013.01); *C08K 3/36* (2013.01)

(56) References Cited

U.S. PATENT DOCUMENTS

| | | | |
|---|---|---|---|
| 2017/0274416 A1* | 9/2017 | Yeom | C03C 17/22 |
| 2019/0351576 A1* | 11/2019 | Ishida | B22F 10/16 |
| 2020/0164431 A1* | 5/2020 | Walker | F01N 13/1861 |

FOREIGN PATENT DOCUMENTS

| | | |
|---|---|---|
| CN | 108103431 A | 6/2018 |
| CN | 109852122 A | 6/2019 |
| CN | 110387148 A | 10/2019 |
| CN | 110404751 A | 11/2019 |

OTHER PUBLICATIONS

CN 1884405 translation (Year: 2006).*
International Search Report issued in International Application No. PCT/CN2020/000141 dated Sep. 22, 2020 (3 pages).
Written Opinion issued in International Application No. PCT/CN2020/000141 dated Sep. 22, 2020 (5 pages).

* cited by examiner

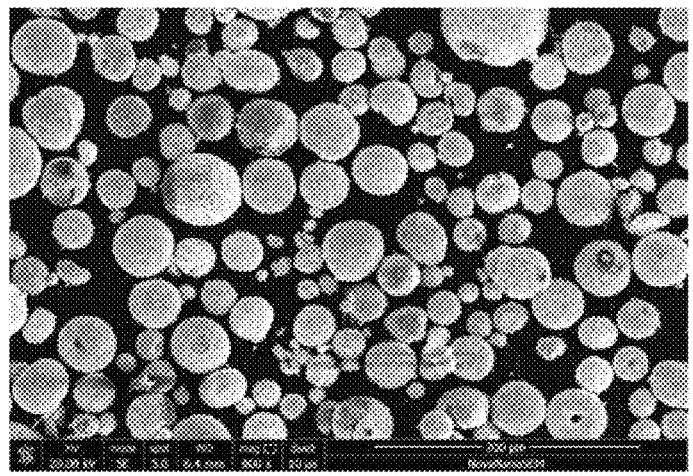

ANTI-ABLATIVE COATING MATERIAL FOR RESIN-BASED COMPOSITE MATERIAL AND PREPARATION METHOD THEREFOR

TECHNICAL FIELD

The present disclosure relates to the field of thermal protection coating materials for resin matrix composites. In particular, the present disclosure relates to an anti-ablation coating material for resin matrix composites and an anti-ablation and thermal protection coating for polyimide resin matrix composites.

BACKGROUND

Polyimide resin matrix composites have a series of advantages, such as their high specific strength, strong designability and good anti-fatigue fracture performance. Therefore, these composites have been widely used in the outer casings, stator blades, rotor blades, containment casings, engine nacelles and thrust reversers of aeroengines, providing obvious weight reduction.

The high operational temperature of advanced aeroengines necessitates higher thermal protection requirements for the service performance of engine components made of polyimide resin matrix composites, such as good performance stability after high temperature scouring at 800-850° C. At present, polyimide resin matrix composites with the best heat resistance can only be used at approximately 300° C. Further improving the heat resistance of these composites is expensive and difficult. Therefore, it is more practical to improve the service temperature by using an appropriate thermal protective coating than to develop new high-temperature resistant resin matrix composites.

The thermal protective coatings commonly used in resin matrix composites at home and abroad mainly include YSZ ($Y_2O_3$-stabilized $ZrO_2$) thermal barrier coatings and other ablative functional coatings (heat capacity absorption, ablative heat protection, radiation heat dissipation, and perspiration heat protection). However, there are many technical difficulties in the preparation of thermal protective coatings on the surface of resin matrix composites. For example, the thermal protection mechanism of ablative coatings is to protect the substrate from damage by means of ablation gasification and carbonization ablation after high-temperature erosion. However, to achieve a better thermal protection effect, the prepared layer is generally thicker, which will significantly reduce its bonding strength with the composite substrate and limits its service life. Thermal barrier coatings (TBCs) have low thermal conductivity, an appropriate expansion coefficient and good thermal insulation performance. TBCs have been widely used for the thermal protection of metal-based surfaces. However, TBCs have a low bonding strength with resin-based composites, and the interlayer stress does not match; thus, they easily fall off, losing the thermal insulation effect they provide during use. The main reason for this result is that compared with the metal matrix, there is no metallurgical reaction or good chimerism between the resin-based composite and coating; in addition, the curing temperature of the composite is low, so when using thermal spraying technology, not only can a high-temperature heat source be pursued (which is greatly conducive to metallurgical bonding), but the surface temperature of the composite matrix can also be strictly controlled by the phase reaction. The thermal expansion coefficient of the coating is quite different from that of the metal or ceramic coating. If the temperature gradient is too high, there will be too much internal stress between the coating and substrate, causing the coating to separate from the substrate. Therefore, eliminating these problems to the greatest extent has become the focus of the development of thermal protection coatings on the surface of composite materials.

Based on the good thermal insulation performance of traditional YSZ thermal barrier ceramic coatings and the concept of the heat protection of ablative coatings, the idea of sweat cooling heat protection and an anti-ablation mechanism is proposed. The ablative phase (phenolic resin, modified silicone resin, polyester, Cu, $SiO_2$) is compounded with a YSZ ceramic; thus, heat is blocked by the good thermal insulation performance of the ceramic matrix phase (YSZ) under high temperature conditions. Additionally, phase transformation, such as decomposition, melting, gasification or volatilization, occurs due to the low melting point of the ablative material inside the YSZ ceramic coating at high temperature, which helps to remove some of the heat. The gas formed after ablation can not only form a thermal blocking effect on the surface of the coating but also form a large number of pores inside the coating, further reducing the thermal conductivity of the coating.

Summary One or more embodiments of the present disclosure provide heat protection for resin matrix composites, especially polyimide resin matrix composites, and establish a method of forming an anti-ablation coating on the surface of resin matrix composites.

An anti-ablation coating material for resin matrix composites is provided. The anti-ablation coating material is a uniform mixture of YSZ, resin, Cu and $SiO_2$, and the mixture consists of spherical particles or spherical aggregates.

The mass ratio of YSZ, resin, Cu and $SiO_2$ is (70-75):(3-9):(8-10):(6-17).

In some embodiments, the resin includes phenolic resin, modified silicone resin and polyester at a mass ratio of (1-3):(2-3):(0-3).

A preparation method for the anti-ablation coating material for resin matrix composites is provided. YSZ powder with particle sizes of 10-20 nm, resin powder with particle sizes of 1-2 μm, Cu powder with particle sizes of 3-5 μm and $SiO_2$ powder with particle sizes of 3-5 μm are uniformly mixed with a mass ratio of (70-75):(3-9):(8-10):(6-17). The resin powder consists of phenolic resin powder, modified silicone resin powder and polyester powder, at a mass ratio of (1-3):(2-3):(0-3). The spray particles of the mixed powder result in spherical particles or spherical agglomerates.

In some embodiments, the binder for the spray granulation of mixed powder is polyvinyl alcohol, and the technological parameters of spray granulation in the intermediate layer are as follows: a heating temperature of 60-80° C., a stirring time of 60-90 min, and a stirring speed of 500-700 RPM; additionally, the granulating steps are carried out under vacuum conditions. The spherical aggregates are obtained with particle sizes of 30-45 μm.

In some embodiments, the mixed powder is obtained by ball milling in a liquid medium (preferably alcohol), and the ball milling parameters are as follows: a rotating speed of 10-20 RPM, a mixing time of 1020 hours; an ultrasonic treatment at a frequency of 10-20 Hz for 1-2 hours; and a drying treatment from 60-90° C. for 1-2 hours.

In some embodiments, the resin powder consists of phenolic resin powder, modified silicone resin powder and polyester powder at a mass ratio of (1-3):(2-3):(0-3).

One or more embodiments of the present disclosure may have the following advantages.

1) By mixing metal (Cu), nonmetal (SiO$_2$) and organic materials (phenolic resin, modified silicone resin and polyester powder) in the composite, a thermal barrier ablative coating with low thermal conductivity and exothermic sweating characteristics is prepared on a ceramic matrix. The characteristic of the thermal barrier ablative composite coating is that the YSZ ceramic matrix blocks heat transfer through its good thermal insulation performance during high-temperature operation. Additionally, the ablative materials, namely the Cu, SiO$_2$, phenolic resin, modified silicone resin, and polyester powder, with relatively low melting points are used to decompose, melt, vaporize or volatilize at high temperatures to remove some of the heat. The gas formed after ablation can not only form a thermal blocking effect on the surface of the coating but also form a large number of pores inside the coating, further reducing the thermal conductivity of the coating.

2) To reduce the damage to the coating caused by the internal pressure of a single ablative material after decomposition or gasification in a narrow temperature range and to keep the coating ablative and heat resistant during high-temperature operation. According to one or more embodiments of the present disclosure, the thermal barrier ablative coating with sweating and exothermic characteristics is designed as a composite material of a YSZ ceramic phase and an ablative organic polymer phase, along with a low melting point metal and SiO$_2$. Compared with the addition of a single ablative phase, the composite material has the characteristics of an ablative material dissipating some of the heat over a wide temperature range, and the residual porous structure further improves the heat insulation and heat protection function. The duration of heat resistance is extended, the heat input rate in the coating is reduced, and the heat does not aggregate at the interface of the composite matrix for a long time, thereby protecting the mechanical properties of the composite.

BRIEF DESCRIPTION OF DRAWINGS

FIG. 1 shows the scanning electron microscopy (SEM) image of YSZ composite and ablative phase (Cu, SiO$_2$, phenolic resin, modified silicone resin, and polyester) powder prepared in example 1.

DETAILED DESCRIPTION

One or more embodiments of the present disclosure are described clearly and completely in combination with examples. Clearly, the described examples are only some of the applications of the invention and does not constitute all of them. Based on the examples of the invention, all other applications obtained by ordinary technicians in the field without original work belong under the protective scope of the invention.

Example 1

An anti-ablation coating material for resin matrix composites is provided. The anti-ablation coating material is a uniform mixture of YSZ, resin, Cu and SiO$_2$, and the mixture consists of spherical particles or spherical aggregates. FIG. 1 shows the scanning electron microscopy (SEM) image of YSZ composite and ablative phase (Cu, SiO$_2$, phenolic resin, modified silicone resin, and polyester) powder prepared in example 1.

The mass ratio of YSZ, resin, Cu and SiO$_2$ is 72:3:8:17.

The resin includes phenolic resin, modified silicone resin and polyester at a mass ratio of 1:2:1.

A preparation method for the anti-ablation coating material for resin matrix composites is provided. YSZ powder with particle sizes of 10-20 nm, resin powder with particle sizes of 1-2 μm, Cu powder with particle sizes of 3-5 μm and SiO$_2$ powder with particle sizes of 3-5 μm are uniformly mixed at a mass ratio of 72:3:8:17. The resin powder is phenolic resin powder, modified silicone resin powder and polyester powder, at a mass ratio of 1:2:1. The atomized granulation of the mixed powder results in spherical particles or spherical agglomerations.

The binder for the spray granulation of the mixed powder is polyvinyl alcohol, and the technological parameters of spray granulation in the intermediate layer are as follows: a heating temperature of 60° C., a stirring time of 60 min, and a stirring speed of 500 RPM; additionally, the granulating link is carried out under vacuum conditions. Spherical pellets with a particle size of 30 μm are obtained.

The mixed powder is obtained by ball milling in liquid medium (preferably alcohol), and the ball milling parameters are as follows: a rotating speed of 10 RPM, a mixing time of 10 hours, an ultrasonic treatment at a frequency of 10 Hz for 1 hour, and a drying treatment at 60° C. for 1 hour.

The resin powder is a phenolic resin powder, modified silicone resin powder, and polyester powder at a mass ratio of 1:2:1.

Example 2

One or more embodiments of the present disclosure are described as follows:

An anti-ablation coating material for resin matrix composites is provided. The anti-ablation coating material is a uniform mixture of YSZ, resin, Cu and SiO$_2$, and the mixture consists of spherical particles or spherical aggregates.

The mass ratio of YSZ, resin, Cu and SiO$_2$ is 72:4:8:16.

The resin includes phenolic resin, modified silicone resin and polyester powder at a mass ratio of 2:2:1.

A preparation method of the anti-ablation coating material for resin matrix composites is provided. YSZ powder with a particle size of 15 m, resin powder with a particle size of 1 μm, Cu powder with a particle size of 3 μm and SiO$_2$ powder with a particle size of 3 μm are uniformly mixed at a mass ratio of YSZ powder, resin powder, Cu powder and SiO$_2$ powder of 72:4:8:16. The resin powder is phenolic resin powder, modified silicone resin powder and polyester powder at a mass ratio of 2:2:1. The atomized granulation of the mixed powder results in spherical particles or spherical agglomerations.

The binder for the spray granulation of the mixed powder is polyvinyl alcohol. The technological parameters of spray granulation in the intermediate layer are as follows: a heating temperature of 70° C., a stirring time of 60 min, and a stirring rate of 500 RPM; additionally, the granulating part is carried out under vacuum conditions. Spherical aggregates with a particle size of 30 μm are obtained.

The mixed powder is obtained by ball milling in a liquid medium (preferably alcohol), and the ball milling parameters are as follows: a rotating speed of 15 RPM, a mixing time of 15 hours, an ultrasonic treatment at frequency of 15 Hz for 1 hour, and a drying treatment at 70° C. for 1 hour.

The resin powder is phenolic resin powder, modified silicone resin powder and polyester powder at a mass ratio 2:2:1.

Example 3

One or more embodiments of the present disclosure are described as follows:

An anti-ablation coating material for resin matrix composites is provided. The anti-ablation coating material is a uniform mixture of YSZ, resin, Cu and $SiO_2$, and the mixture consists of spherical particles or spherical aggregates.

The mass ratio of YSZ, resin, Cu and $SiO_2$ is 74:8:8:10.

The resin includes phenolic resin, modified silicone resin and polyester at a mass ratio of 2:2:2.

A preparation method for the anti-ablation coating material for resin matrix composites is provided. YSZ powder with a particle size of 15 nm, resin powder with a particle size of 2 μm, Cu powder with a particle size of 2 μm and $SiO_2$ powder with a particle size of 4 μm are uniformly mixed at a mass ratio of 74:8:8:10. The resin powder consists of phenolic resin powder, modified silicone resin powder and polyester powder at a mass ratio of 2:2:2. The atomized granulation of the mixed powder results in spherical particles or spherical agglomerations.

The binder for the spray granulation of the mixed powder is polyvinyl alcohol. The technological parameters of spray granulation in the intermediate layer are as follows: a heating temperature of 70° C., a stirring time of 80 min, and a stirring rate of 600 RPM; additionally, the granulating part is carried out under vacuum conditions. Spherical aggregates with a particle size of 45 m are obtained.

The mixed powder is obtained by ball milling in a liquid medium (preferably alcohol), and the ball milling parameters are as follows: a rotating speed of 15 RPM, a mixing time of 15 hours, an ultrasonic treatment at a frequency of 20 Hz for 2 hours, and a drying treatment at 90° C. for 2 hours.

The resin powder consists of phenolic resin powder, modified silicone resin powder, and polyester powder at a mass ratio of 2:2:2.

Example 4

One or more embodiments of the present disclosure are described as follows:

An anti-ablation coating material for resin matrix composites is provided. The anti-ablation coating material is a uniform mixture of YSZ, resin, Cu and $SiO_2$, and the mixture consists of spherical particles or spherical aggregates.

The mass ratio of YSZ, resin, Cu and $SiO_2$ is 75:9:10:6.

The resin includes phenolic resin, modified silicone resin and polyester at a mass ratio of 3:3:3.

A preparation method for the anti-ablation coating material for resin matrix composites is provided. YSZ powder with a particle size of 20 nm, resin powder with a particle size of 2 μm, Cu powder with a particle size of 5 μm and $SiO_2$ powder with a particle size of 5 μm are uniformly mixed at a mass ratio of 75:9:10:6. The resin powder consists of phenolic resin powder, modified silicone resin powder and polyester powder at a mass ratio of 3:3:3. The atomized granulation of the mixed powder results in spherical particles or spherical agglomerations.

The binder for the spray granulation of the mixed powder is polyvinyl alcohol. The technological parameters of spray granulation in the intermediate layer are as follows: a heating temperature of 80° C., a stirring time of 90 min, and a stirring rate of 700 RPM; additionally, the granulating part is carried out under vacuum conditions. Spherical aggregates with a particle size of 45 μm are obtained.

The mixed powder is obtained by ball milling in a liquid medium (preferably alcohol), and the ball milling parameters are as follows: a rotating speed of 20 RPM, a mixing time of 20 hours, an ultrasonic treatment at a frequency of 20 Hz for 2 hours, and a drying treatment at 90° C. for 2 hours.

The resin powder consists of phenolic resin powder, modified silicone resin powder and polyester powder at a mass ratio of 3:3:3.

It should be understood that for those skilled in the field, improvements or transformations can be made according to the above descriptions, and all these improvements and transformations will fall within the protected scope of the appended claims of this invention.

The ranges of this disclosure may be expressed in the disclosure as from about one particular value, to about another particular value, or both. When such a range is expressed, it is to be understood that another embodiment is from the one particular value, to the other particular value, or both, along with all combinations within this range.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

The invention claimed is:

1. An anti-ablation coating material for resin matrix composites, comprising: a mixture of 70-75 parts of yttria-stabilized zirconia (YSZ), 3-9 parts of a resin, 8-10 parts of Cu, and 6-17 parts of $SiO_2$, by mass,
   wherein the mixture is uniform and includes spherical particles or spherical aggregates.

2. The anti-ablation coating material according to claim 1, wherein the resin includes 1-3 parts of a phenolic resin, 2-3 parts of a modified silicone resin, and 0-3 parts of a polyester, by mass.

3. A method for preparing a resin matrix composite for an anti-ablation coating for resin matrix composites, comprising:
   mixing YSZ, a resin, Cu, and SiO2 to obtain a mixed powder;
   wherein particle sizes in the mixed powder are 10-20 nm for the YSZ, 1-2 pm for the resin, 3-5 pm of the Cu, and 3-5 pm of the SiO2, the mixed powder includes 70-75 parts of the YSZ, 3-9 parts of the resin, 8-10 parts of the Cu, and 6-17 parts of the SiO2, by mass; and
   performing spray granulation of the mixed powder to obtain a resin matrix composite including spherical particles or spherical agglomerates.

4. The method according to claim 3, wherein a binder for the spray granulation is polyvinyl alcohol, a heating temperature for the spray granulation is 60-80° C., a stirring time for the spray granulation is 60~90 min, and a stirring rate for the spray granulation is 500-700 rpm, a vacuum is used for the spray granulation, and the spherical particles are 30-45 μm in size.

5. The method according to claim 3, further comprising:
   ball milling the mixed powder in a liquid medium, at a rotating speed of 10-20 rpm, a mixing time of 10-20 hours;

ultrasonic treating at a frequency of 10-20 Hz for 1-2 hours; and drying at 60-90° C. for 1-2 hours.

6. The method according to claim 5, wherein the liquid medium is alcohol.

7. The method according to claim 3 wherein the resin includes 1-3 parts of a phenolic resin, 2-3 parts of a modified silicone resin, and 0-3 parts of a polyester, by mass.

* * * * *